United States Patent [19]
Baugher et al.

[11] Patent Number: 5,694,548
[45] Date of Patent: Dec. 2, 1997

[54] SYSTEM AND METHOD FOR PROVIDING MULTIMEDIA QUALITY OF SERVICE SESSIONS IN A COMMUNICATIONS NETWORK

[75] Inventors: Mark John Baugher; Isabel Berdeen Van Horn, both of Austin, Tex.

[73] Assignee: International Business Machines Corporation, Armonk, N.Y.

[21] Appl. No.: 85,264

[22] Filed: Jun. 29, 1993

[51] Int. Cl.$^6$ .................................................. G06F 13/42
[52] U.S. Cl. ........................... 395/200.12; 395/200.1; 395/200.04; 370/231; 370/235
[58] Field of Search ................... 395/200, 200.12, 395/200.1, 200.04; 370/85.5, 85.4, 85.8, 110.1, 82, 94.1, 60, 85.6, 95.1, 231, 235; 340/825.01, 825.02, 825.03

[56] References Cited

U.S. PATENT DOCUMENTS

| | | | |
|---|---|---|---|
| 4,539,679 | 9/1985 | Bux et al. | 370/475 |
| 4,991,079 | 2/1991 | Dann | 395/200.08 |
| 5,081,623 | 1/1992 | Ainscow | 370/85.4 |
| 5,251,209 | 10/1993 | Jurkevich et al. | 370/82 |

FOREIGN PATENT DOCUMENTS 0 413 488 A2  2/1991  European Pat. Off. .

OTHER PUBLICATIONS

"MPEG++: A Robust Compression and Transport System for Digital HDTV", K. Joseph et al, Signal Processing Image Communication, vol. 4, No. 4/5, Amsterdam, NL, pp. 307–323.

As "Layered Required Bandwidth for Heterogenous Traffic", J. Y. Hui, IEEE 1992, vol. 1 of 3, May 4, 1992 Florence, pp. 13–20.

At "The Asynchronous Transfer Mode: A Tutorial", J. Le Boudec, Computer Networks International Journal of Distribution Informatique, vol. 4, No. 15, May 1992, Amsterdam, NL, pp. 279–309.

"Experimental Internet Stream Protocol, Version 2 (ST–II)", CIP Working Group, Oct., 1990.

"Study Group XI—Report R 133", Internatinoal Telegraph and Telephone Consultative Committee, COM X1–R 133–E, Oct., 1991.

P. Zafiropulo et al, "Data/Voice Integration Based on the IEEE 802.5 Token–Ring Lan", IBM Research Report, RZ 1463, Apr. 25, 1986.

"Dorado Beach Transmit Queue Control Guidelines", IBM document, Feb. 2, 1993, 5.

C. L. Liu et al, "Scheduling Algorithms for Multiprogramming in a Hard–Tel–time Enivronment", Journal of the Association for Computing Machinery, vol. 20, No. 1, Jan. 1973, pp. 46–61.

(List continued on next page.)

*Primary Examiner*—Larry D. Donaghue
*Attorney, Agent, or Firm*—Robert M. Carwell

[57] ABSTRACT

A system and method ensure transmission of data elements between computers at a preselected quality of service. A computer in a layered reference model communication network requests a preselected quality of service for selected transmissions. An existing session is employed whereby transmissions having a variety of preselected quality of service guarantees are multiplexed onto the existing session. Data elements having the preselected qualities of service are transferred from service channels of another such layer. One, a system and method are provided for use between layer N+1 and layer N, wherein elements from two or more service channels from N+1 are transferred to one or more service channels in layer N such that a preselected quality of service is provided for the elements being transferred. Elements from a service channel having a higher priority, deadline, or period are transferred from the layer N+1 service channel to the layer N service channel before elements from a service channel having a lower priority, deadline, or period. In yet another embodiment, the number of elements are constrained whereby no more than a fixed number of such elements will receive service in a layer N service channel at a given point in time.

27 Claims, 7 Drawing Sheets

OTHER PUBLICATIONS

D. Ferrari et al, "A Scheme for Real-time channel Establishment in Wide-Area Networks", IEEE Journal on Selected Areas in Communications, vol. 8, No. 3, Apr. 1990, 0733-8716/90/0400-0368, pp. 368-379.

D. Ferrari, "Client Requirements for Real-Time Communication Services", IEEE Communications Magazines, Nov. 1990, 0163-6804/90/0011-0065, pp. 65-72.

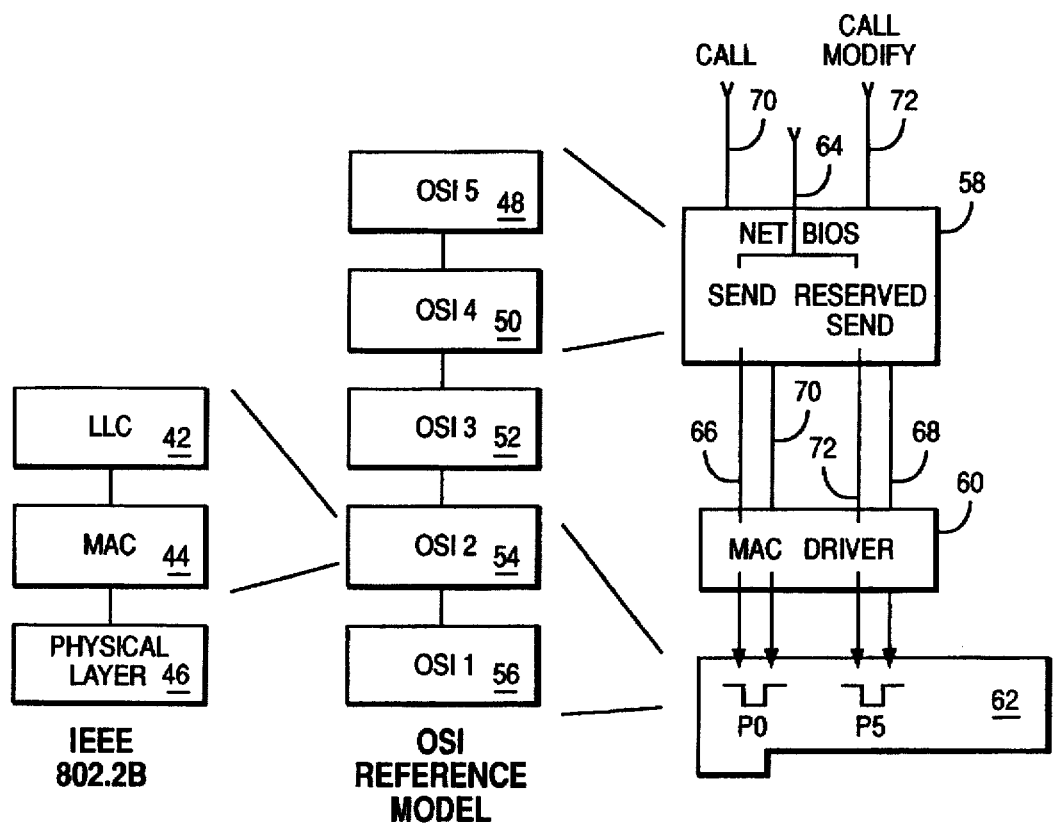
FIG. 3
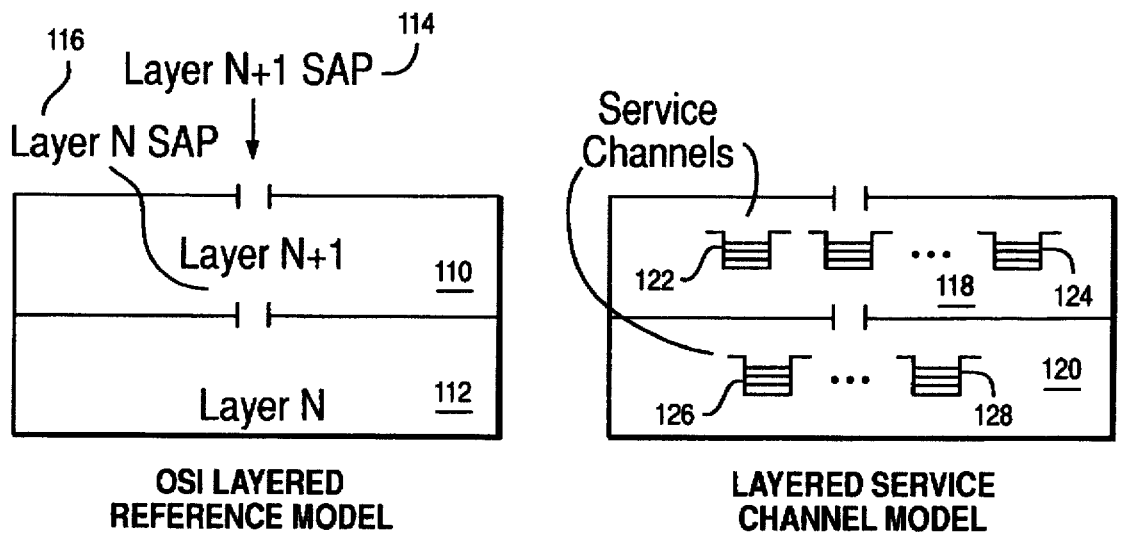
FIG. 6
FIG. 7

SEPARATE SESSIONS FOR SEPARATE FLOWS

MULTIPLEXED FLOWS ONTO SINGLE SESSION

SYSTEM AND METHOD FOR PROVIDING MULTIMEDIA QUALITY OF SERVICE SESSIONS IN A COMMUNICATIONS NETWORK

TECHNICAL FIELD

The present invention relates to data processing systems and, more particularly, to such systems providing for multimedia connections or sessions.

BACKGROUND OF THE INVENTION

It has long been known to provide computer workstations interconnected by digital communication networks whereby users of the individual workstations may communicate with one another over the network, previously common, for example, by means of a typed note, data or program file transmitted to another user. More recently, users have increasingly requested desktop conferencing, remote presentations, and other multimedia applications between network users. However, such multimedia applications, having associated therewith data-intensive sound, voice, and video flows. This requires concomitant high bandwidth communication links between distributed computing systems with minimal communication delay, maximum throughput, and instantaneous burst communication capability. The requirements of such multimedia applications accordingly make scheduling appropriate resources to provide for necessary quality of service very difficult.

Prior art has recognized that certain data in a network, such as that associated with multimedia, may require priority handling. Thus, for example, a "quality of service" (QOS) has been defined in the literature, hereinafter described in more detail. This seeks to describe various parameters which may be specified in an attempt to define certain minimum requirements which must be met for transmission of given data types over the network. See, for example, quality of service standards set forth in the Open System Interconnect Standard X.214 of the International Standards Organization interface and the quality of service standards defined in CCITT Q.931 (ISDN), Q.933 (frame relay), and Q.93B (B-ISDN ATM) drafts.

As yet another example there is an architected priority mechanism in the IEEE 802.5 Token Ring. A station on the ring with a high priority frame to send may indicate this in an access control field of a passing frame. When a station sending the frame releases the token, it releases the token at the priority of the AC field, and eventually sets it back to its original priority as specified in an IEEE 802.5 medium access control protocol. The IEEE standard and implementations thereof merely specify a protocol for increasing and decreasing priority, but each station is unconstrained in its use of priority beyond this protocol.

This in turn gives rise to a serious problem associated with the prior art. In seeking to accommodate situations in which a high priority channel is required to guarantee real time service for multimedia traffic, one approach, since each station is unconstrained, has been for users to indiscriminately increase the priority of their flows. Such increases often result in no guarantees for multimedia quality of service in that no discrimination is provided, e.g. all users simply increase their priorities.

As yet another example of this, unconstrained use of priorities has resulted in bridges and routers loading so much high priority data as to flood the token rings and the like with this priority traffic such that multimedia traffic obtains no guaranteed priority. Again, this results from no discrimination between differing connections, sessions, and transmit operations.

Clearly other instances in the communication art have recognized the notion of a need for differing priority of data types, whether in the form of multiple channels with different priorities (such as the IBM LAN Streamer Token Ring Adapter Card with two transmit channels, and the 100 Mbps Ethernet System with priority channels) and the synchronous/asynchronous approach of, for example, the FDDI standards, a representative example of which is the FDDI SMT 7.X.

Moreover, it is clear in the literature that the notion of scheduling data in differing priorities is well known. See for example Liu and Layland, *Scheduling Algorithms For Multiprogramming in a Hard-Real-Time Environment*, Journal of the Association for Computing Machinery, Vol. 20, #1, January, 1973, where "rate-monotonic priority assignment" is discussed, page 50. Also see, for example, Dominico Ferrari, *A Scheme for Real Time Channel Establishment in Wide Area Networks*, IEEE Journal of Selected Areas in Communications, Vol. 8, #3, April, 1990, page 368. In this reference modification of an earliest due date (EDD) policy is presented which governs differing levels of priority assigned to tasks.

Similarly, the notion of specifying performance requirements in real time communication services is further addressed in another reference to Dominico Ferrari, *Client Requirements for Real-Time Communication Services*, IEEE Communications Magazine, November 1990, page 65, wherein it is noted that a client and server will negotiate a specification for their respective requirements for services including delay bounds, throughput bounds, and the like.

From the foregoing it is clear that notions in the art have developed of varying degrees of priority service (based upon deadlines variously computer as burst/throughput or as a specified delay bound) being required in communication networks. However, several problems have remained in implementing a successful system which addresses the needs for guaranteeing real time service for multimedia traffic. First there is the aforementioned problem of lack of discrimination amongst the traffic whereupon users indiscriminately simply designate all their traffic to a higher priority, thereby "congesting" the network.

Yet another problem not effectively addressed by the prior art relates to the emergence of heterogeneous networks from differing vendor implementations of multimedia sessions. Their equipment has differing capabilities e.g. speed and capacity, and make quality of service guarantees problematic since over-reservation (or overcommitment) of resources can result in long-term throughput or short-term delays to violate pre-specified QOS. To be practical, this requires that in providing for reserved bandwidth connections, a solution must be provided which minimizes changes to application program interfaces and underlying client implementations. Yet another problem relates to failure to provide for multiple priority queues or channels extending through multiple layers since end-to-end delivery among digital computing devices requires services of multiple layers of the OSI model. The link layer guarantees service between two ends of a digital communication link and network over multiple links. Transport services at the endpoint must all provide QOS guarantees using priority service to meet deadlines.

Thus, particularly with the proliferation of multimedia data content, the industry was in need of a communication system providing for multimedia flows with quality of service guarantees at the transport and network layers utilizing reserved bandwidth networks whereby the session might be controlled to ensure that traffic from the session remains within traffic descriptors.

SUMMARY OF THE INVENTION

According to the present invention there is provided a system and method for effecting multimedia quality of service sessions in a communication network.

These and other objects of the present invention are accomplished by the operation of computerized system components implementable in hardware or software or in combination. The components regulate access to priority queues or transmit channels in a preferred embodiment which are attached to the shared medium local area network or any point-to-point digital communications link over copper, fiber, radio or satellite transponders.

In the preferred embodiment, a system and method are provided for use in an OSI layered reference model computer communication network for ensuring that transmissions of data elements between computers obtain a preselected quality of service. A computer in the network requests from another such digital service a preselected quality of service for selected transmissions. A determination is made if resource is available within the computers and network to meet the preselected quality of service. An existing session or connection between the computers is then employed such that transmissions having a variety of preselected quality of service guarantees, even comingled with such transmissions having no quality of service guarantees, are multiplexed onto the existing session or connection. In one form of the invention, the quality of service is altered in the session or connected by means of a session-modify command.

The priority, deadline, or period of each particular transmission on the session or connection is identified prior to transferring data elements having the preselected qualities of service on the session or connection. In one embodiment, the priority, deadline, or period is a computed function of a ratio of the burst and throughput quality of service parameters, and the session or connection transmission is effected by a reserved-send command. The data elements having the preselected qualities of service are thence transferred from service channels at one layer of the OSI layered reference model to one or more service channels of another such layer. The lower layer service channels are selected from a group comprising priority token ring service channels, B-ISDN ATM service channels (corresponding to services in the ASM adaptation layers), 100 Mbps Ethernet high and low priority channels, and synchronous/asynchronous FDDI service channels.

In another embodiment of the invention, wherein a pre-established session has been transferring data elements without a quality of service requirement, upon occurrence of the need for a quality of service guarantee, a new session or connection is established, in one form employing a call-modify command. Data elements belonging to this next session or connection having the preselected quality of service requirement are thence transferred from one or more service channels at one layer of the OSI layered reference model to one or more service channels of another such layer.

In both embodiments, a system and method are provided for use between a layer N+1 and layer N in an OSI layered reference model implementation, wherein elements from two or more service channels from layer N+1 are transferred to one or more service channels in layer N, such that a preselected quality of service is provided for the elements being transferred. A reserved-send-with-specified-priority operation is provided in which the reserved-send is augmented with a parameter that describes the urgency, deadline or period of the transmission, e.g. throughput/burst.

More particularly, elements from a service channel having a higher priority, deadline, or period are transferred from the layer N+1 service channel to the layer N service channel before elements from a service channel having a lower priority, deadline, or period.

In yet another embodiment, the number of elements from a service channel having a layer priority, deadline, or period are transferred from the layer N+1 service channel to a layer N service channel are constrained whereby no more than a fixed number of such elements will receive service in a layer N service channel at a given point in time.

BRIEF DESCRIPTION OF THE DRAWINGS

FIG. 3 is a representation of a layered open systems interconnection model showing the relationship of components of the subject invention to the layers;

FIG. 6 is a simplified illustration of a portion of the open system interconnection layered reference model for FIG. 3 depicting the abstraction of multiple layers with corresponding service access points.

FIG. 7 is a simplified illustration of a layered service channel model portion of the open system interconnection model of FIG. 3.

DETAILED DESCRIPTION OF THE PREFERRED EMBODIMENT

Figure 1:
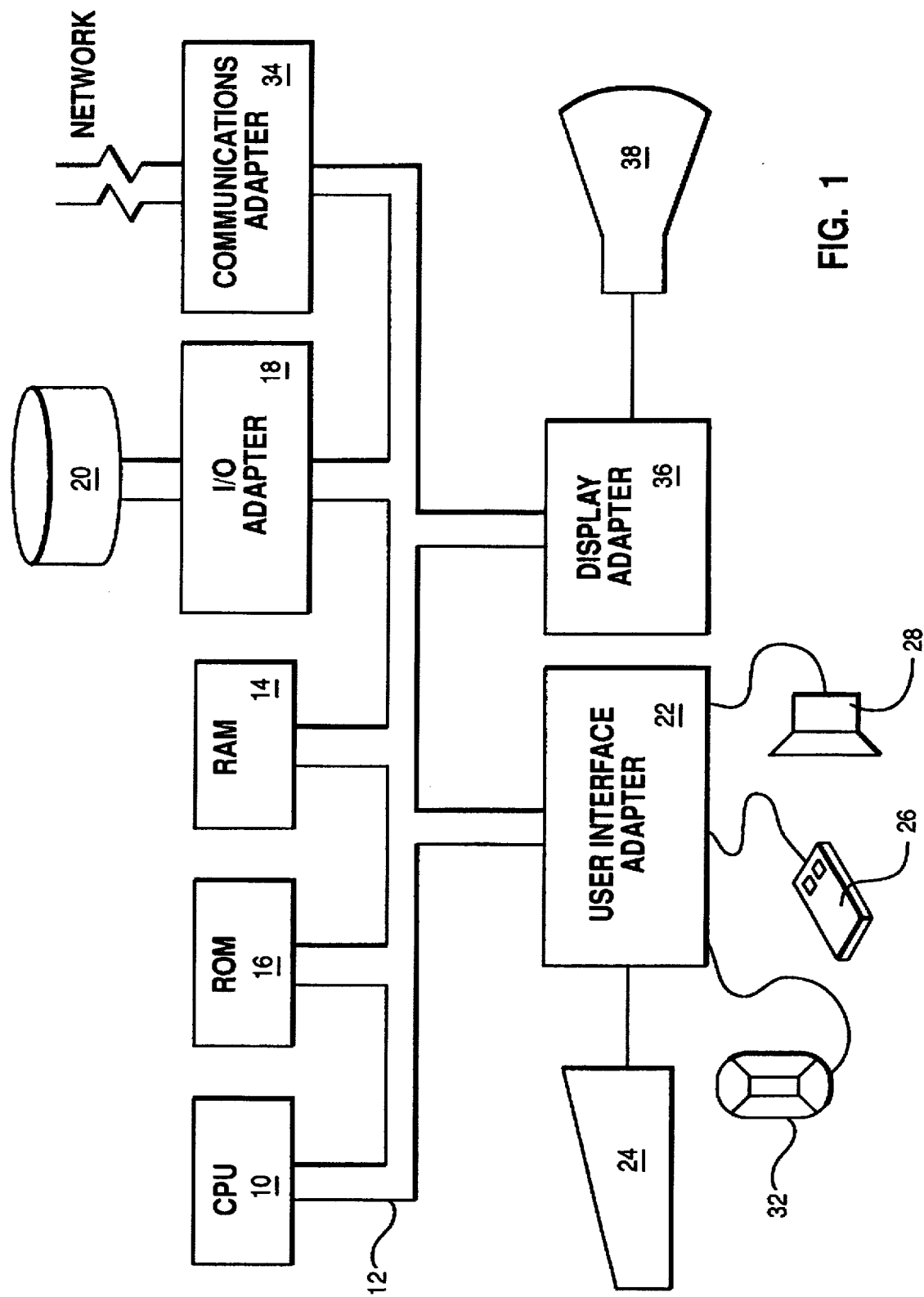
FIG. 1 is a block diagram showing the configuration of a typical workstation in accordance with the subject invention.

Referring now to FIG. 1, there is illustrated a typical hardware configuration of a workstation with a central processing unit 10, and a number of other units interconnected via a system bus 12. The workstation shown in FIG. 1 includes a random access memory (RAM) 14, read only memory (ROM) 16, and I/O adapter 18 for connecting peripheral devices such as disk units 20 to the bus, a user interface adapter 22 for connecting a keyboard 24, mouse 26, loudspeaker 28, microphone 32, and/or other user interface devices to the bus, a communication adapter 34, for connecting the workstation to a data processing network, and a display adapter 36 for connecting the bus to a display device 38.

FIG. 1 depicts a typical "intelligent" workstation, however, the workstation may in fact be a "dumb" terminal with only a limited processing capability under control of a host processor. Alternatively, the workstation may be a simple digital device for presenting audio or video streams. This is made clear in connection with FIG. 2.

Figure 2:
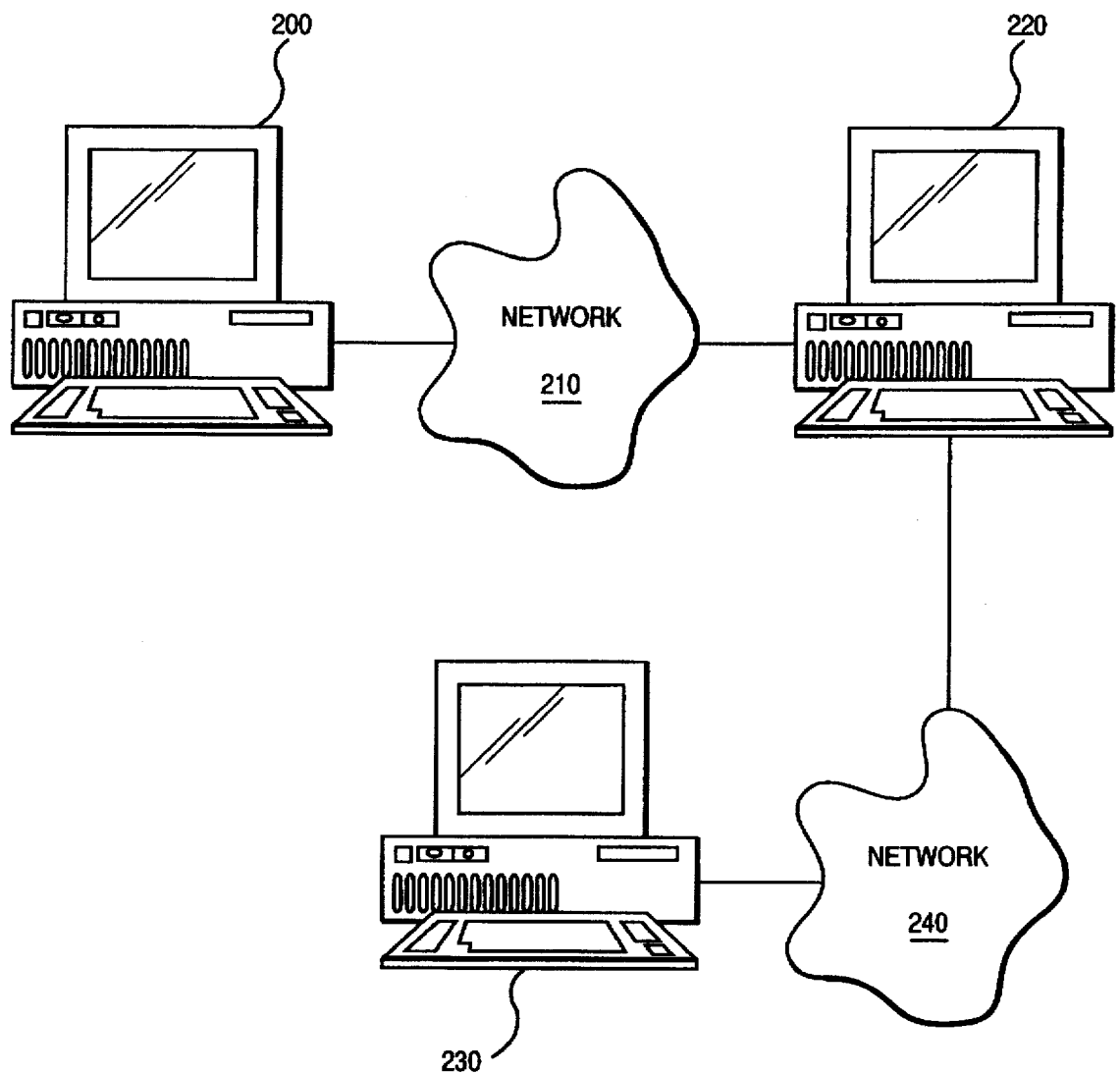
FIG. 2 is an illustration of a data processing system including three workstations interconnected by a network in accordance with the subject invention.

FIG. 2 illustrates a data processing system comprising a number of workstations (here, three workstations 200, 220, and 230) interconnected by a pair of data networks 210 and 240, so as to permit communication between the workstations. It is assumed that the data processing system shown in FIG. 2 is of a type which permits concurrent real-time communication between the users. The network operates according to a conventional network protocol, such as the token ring protocol described in *Token Ring Network Architecture* reference, SC30-3374, IBM, 1989.

FIG. 2 depicts only one possible hardware configuration for a data processing network. Other configurations are possible. For example, the data processing system could be based upon a star network, or a host processor connected to a plurality of dumb terminals, or could further be based upon a plurality of remote processors connected by a communication network. The networks could also be based upon a telephone network, an ISDN network, or any other "dial up" networks. Moreover, the workstations could be located within the single workspace or within a local area, or could be remote from one another. A source for detailing technical planning information for configuring a network of workstations in accordance with the invention, is the *IBM Extended Services for OS/2 Example Scenarios Manual*, 1991.

Multimedia computing is the processing of various media, such as video, waveform audio, musical instrument digital interface (MIDI) streams, animation, graphics, and text. Such processing includes the capture, authoring (editing) and playback of media streams as well as other data processing applications. Multimedia documents which are stored on some non-volatile medium, such as a disk, are referred to as recorded multimedia applications. There are also live multimedia applications in which two or more people communicate with each other at the same time using a computer. Live multimedia applications are normally conducted across space and time indicating that live multimedia is inherently distributed. Even recorded multimedia applications require distributed file system services to share large volumes of stored media, such as video disk, audio information, or computer-generated images. Thus, it is critical that a prioritizing scheme in accordance with the invention for multimedia applications includes support for a distributed environment.

To reduce design complexity, most networks are organized as a series of layers, each one built upon its predecessor as described in *Computer Networks*, Tannenbaum, Andrew S., Prentice Hall (1988) and *OSI, A Model for Computer Communications Standards*, Black, Ulyess, Prentice Hall, 1991. The number of layers, the name of each layer, contents, and function of each layer differ from network to network. However, in each network, the purpose of the layers is to offer certain services to the higher layers, shielding those layers from the details of how the offered services are actually implemented. The purpose, function, and details of each of the layers and their interaction is set forth in the previously noted references and is familiar to communication programmers ordinarily skilled in the art.

The transport layer accepts data from the session layer, splits it up into smaller units and passes the units to the network layer to ensure that the pieces all arrive at the other end. Details of the transport layer and how it fits into the OSI architecture are shown in FIG. 18 of the Tannenbaum book and described in the related pages. A representative of network architecture that provide technical standards documents for the networking framework are *ISO/IEC JTC 1/SC 21 Information Retrieval, Transfer and Management for OSI Secretariat*: USA (ANSI) (3294) *Basic Reference Model Management Framework* (7498-4), and *Management Information Model* (3324) ISO, 1989.

One way of looking at the transport layer is to regard its primary function as enhancing the Quality of Service (QOS) provided by the network layer. QOS can be characterized by a number of specific parameters. The OSI transport service allows a user to specify preferred, acceptable, and unacceptable values for these parameters when a connection is made. Some of these parameters also apply to connectionless transports. The transport layer examines the parameters, and depending upon the kind of network services available to it, determines whether the transport layer can provide the necessary service. Representative QOS parameters are:

Connection Delay, which is the amount of elapsed time between a transport connection being requested and confirmation being received by the user, which, as with all parameters dealing with delay, the shorter the delay the better;

Connection Establishment Failure Probability is the probability of a connection not being established within the maximum establishment dealt time. Network congestion, lack of table space, and other internal problems affect this value;

Throughput measures the number of bytes of user data transferred per second as measured over a recent time interval, and is measured separately for each direction;

Transit Delay measures the time between a message being sent by the transport user on the source machine and its being received by the transport user on the destination machine;

Residual Error Rate measures the number of lost or garbled messages as a fraction of the total sent in the sampling period. In theory, the residual error rate should be equal to zero since it is the job of the transport layer to hide all network layer errors.

Yet additional QOS parameters includes;

Transfer Failure Probability which measures how well the transport service is living up to its assigned tasks. When a transport connection is established, a given level of throughput, transit delay, and residual error are agreed upon. The transfer failure probability gives the fraction of times that these agreed upon goals were not met during some time period;

Connection Release Delay is the amount of time elapsing between a transport user initiating a release of a connection and the actual release occurring at the end;

Connection Release Failure Probability (CRFP) is the fraction of a connection release attempts which did not complete within the agreed-upon connection release delay interval;

Protection provides a way for the transport user to specify interest in having the transport layer provide protection against unauthorized third parties reading or changing reading or changing transmitted information;

Resilience yields the probability of the transport layer spontaneously terminating a connection due to internal problems or congestion.

The hereinbefore-noted QOS parameters are specified by a transport application when a connection is requested. Both the desired, minimum, and maximum acceptable values are given. In some cases, the transport layer immediately recognizes that the values are not achievable. When this occurs, the communication attempt fails, and an appropriate exception is noted. In other cases the transport layer knows that it cannot achieve the desired goal, but can achieve a lower, but still acceptable rate. The lower rate, minimum acceptable rate, and maximum acceptable rate are sent to the remote machine requesting the established of a connection. If the remote machine cannot handle the proposed value, but can handle a value above the minimum or below the maximum, then it may lower the parameter to its value. If it cannot handle any value above a minimum, then it rejects the connection attempt. Then, the originating transport application is informed of whether the connection was established or rejected.

This process is called open negotiation. Once the options have been negotiated, they remain that way through the life of the connection. The OSI Transport Service Definition, (ISO 8072) does not specify the QOS parameters. These are normally agreed upon by a carrier and customer. A T-connect request is employed to initialize communication, and the QOS is specified as part of this transactions. Details on the transport primitives are found in the aforementioned reference. Below the transport and network layers are the link or MAC layers in the OSI and IEEE 802 reference models to be hereinafter described. Some MAC protocols, such as synchronous FDDI, provide guarantees for throughput, delay, and delay variation to applications. Other MACs such as the Token Ring and Token Bus have architected priority mechanisms which can support quality of service guarantees (throughput, delay, etc.) when the subject invention is employed.

Priority assurance is an important factor in ensuring QOS, and is enabled by operation of a component which may be implemented in hardware logic or software. The component regulates access to the priority queues or transmit channels that are attached to the shared medium local area network section. Access to the priority queue or transmit channels will pass through this component, thus subjecting all communication transactions to rejection or tracking by the component. A more detailed discussion of this component and the related station's bandwidth manager component are described in *NetWork Priority Management*, U.S. patent application, (AT9-92-089) Ser. No. 07/930,587, filed Aug. 17, 1992.

Turning now to FIG. 3, depicted there is a schematic representation of several forms of a multilayered computer communication network model based upon the OSI layered reference model. Further detail of this OSI and related IEEE models may be found in *OSI, A Model for Computer Communications Standards*, infra. The first five layers of the OSI model are shown in FIG. 3 as reference numerals 48–56. The lowest layer is the physical layer OSI 1, 56, which is responsible for implementing a physical circuit between data terminal equipment and data circuit terminating equipment.

The data link or second layer, OSI 2, 54, is responsible for transfer of data across the link. The third or network layer, OSI 3, 52, specifies the interface of the user into a network and also defines network switching/routing and communications between networks. The fourth or transport layer, OSI 4, 50, provides an interface between the data communications network and the upper three layers. This layer is of particular interest inasmuch as it provides the user options in obtaining certain levels of quality, and is designed to keep the user isolated from some of the physical and functional aspects of the network.

The fifth or session layer, OSI 5, 48, serves as a user interface into the transport layer below, providing a means for exchange of data between users such as simultaneous transmission, alternate transmission, checkpoint procedures and the like. The remaining two layers, the presentation layer and application layer (not depicted), ensure that user applications can communicate with each other and further concern the support of the end-user application process.

It will be noted from FIG. 3 that there are other implementations in the art of such an OSI reference model bearing varying degrees of similarity thereto, a portion of one being depicted in the left part of FIG. 3 as the IEEE model. A physical layer 46 may be seen corresponding to the first layer 56 of the OSI model. The IEEE recognized the need to divide the data link layer OSI 2, 54, into two sublayers in order to handle different link configurations and thus a medium access control (MAC), 44, and logical link control (LLC), 42, were provided for. The IEEE model is specialized to links which are shared media, e.g. having more than two connected stations. The MAC sublayer is media specific (such as to a LAN such as Ethernet) whereas the LLC, 42, serves as an interface to an upper layer protocol, typically the network layer (and isolates the network layer from the specific actions of the MAC sublayer). One purpose of depicting varying forms of a multilayered computer communication network in FIG. 3 is to illustrate that the invention admits to implementations in any number of such multilayered models, and is thereby not intended to be limited to application to the OSI reference model emphasized in the description herein.

Still referring to FIG. 3, a more practical implementation of the invention is shown in the righthand portion thereof as it relates to the theoretical reference models just described. More particularly, there is first shown an adapter card 62, implementing the physical layer and part of the MAC of the reference model. In a preferred form, this adapter card will provide for a plurality of priority channels, services or queues, as illustrated by the P0 and P5 channels. The figure is further intended to indicate that the adapter card 62 will be for at least two channels through which data elements may flow, each such channel having a differing priority. Although a P0 and P5 have been shown, the invention admits to implementations with more priority channels as required (with, conventionally, the right or higher numbered channels such as P5 indicating higher priority whereby data elements transferred through this channel will be transmitted in preference over those at a lower priority. A media access control software driver 60 is also shown implementing the MAC sublayer 44 in the IEEE model, for example, and finally a netbios or functionally equivalent form of LAN software, 58, is shown implementing the session layer 5 of the OSI reference model.

It is important to note that the invention contemplates implementation of multiple service channels in the lower layers of the architecture in a number of forms and is not intended to be limited to any particular such implementation. Thus the channels depicted with associated priorities P0 and P5 may be implemented as priority token ring service channels, B-ISDN ATM service channels, 100 Mbps Ethernet high and low priority channels, and even as lower layer service channels in the synchronous and asynchronous FDDI form of priority channels or queues.

Still referring to FIG. 3, as will be described hereinafter in greater detail, yet an additional feature of the invention is shown depicted therein. In a preferred embodiment, once a session has been established, shown at reference numeral 64, data elements having a preselected QOS belonging to the session or connection from one or more such just described service channels at one layer of the OSI layered reference model (such as the netbios layer 58), will be transferred to one or more service channels of yet another layer such as that of the MAC driver 60 or physical layer 62. This is schematically depicted by the line 64 splitting into two parallel downward arrows culminating in the two channels P0 and P5 having differing priorities, shown as arrows 66 and 68.

In another form of the invention, a pre-existing session shown as arrow 70 may have been established which may not have required a quality of service. Such a session may have been established by a call command. When a determination is made by the system that a multimedia transmission requiring a guaranteed quality of service is required, a new session may be established by a call modify, shown by the arrow 72 extending downwards through the various reference model layers and terminating in the P5 channel. This is intended to indicate that when such multimedia data transmissions are required, in implementations allowing for only one session per file or connection, this form of the invention will provide for a next session operating at higher priority to effect the desired quality of service guarantee at, for example, the higher P5 priority.

Figure 4:
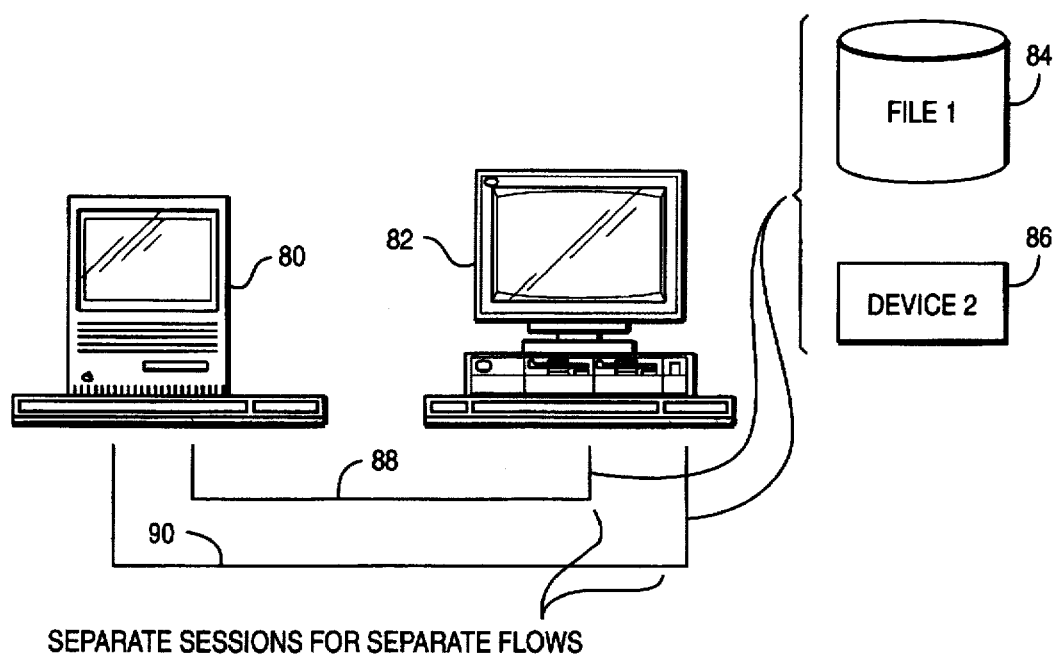
FIG. 4 is a simplified illustration of a workstation network interconnection in one embodiment of the invention providing for separate sessions having differing priorities.

This latter form of the invention may be seen more clearly depicted in FIG. 4. In this embodiment there may be various forms of data in need of transfer shown generically as file 1, 84, and a second device 2, 86, each form of data having associated therewith either no quality of service requirement or some form of quality of service guarantee dependent upon the data type. For example, device 2 might be a real time video capture card having a relatively high throughput requirement of perhaps 150 KBS, whereas the data associated with file 1 may be digitized audio requiring a lesser QOS or perhaps even a binary executable file or text file with no particular required QOS.

As previously described, a first session 88 may have previously been established between two computers 80 and 82 on the network for transmission of non-QOS data such as that from file 1. Upon determination of the capability of the network to transfer QOS data, in one embodiment, a next session (shown schematically at reference numeral 90) may thereafter be established between the computers 80-82 wherein a QOS is bound to this next session 90 to carry the multimedia data associated with device 2, 86, at a guaranteed QOS.

Figure 5:
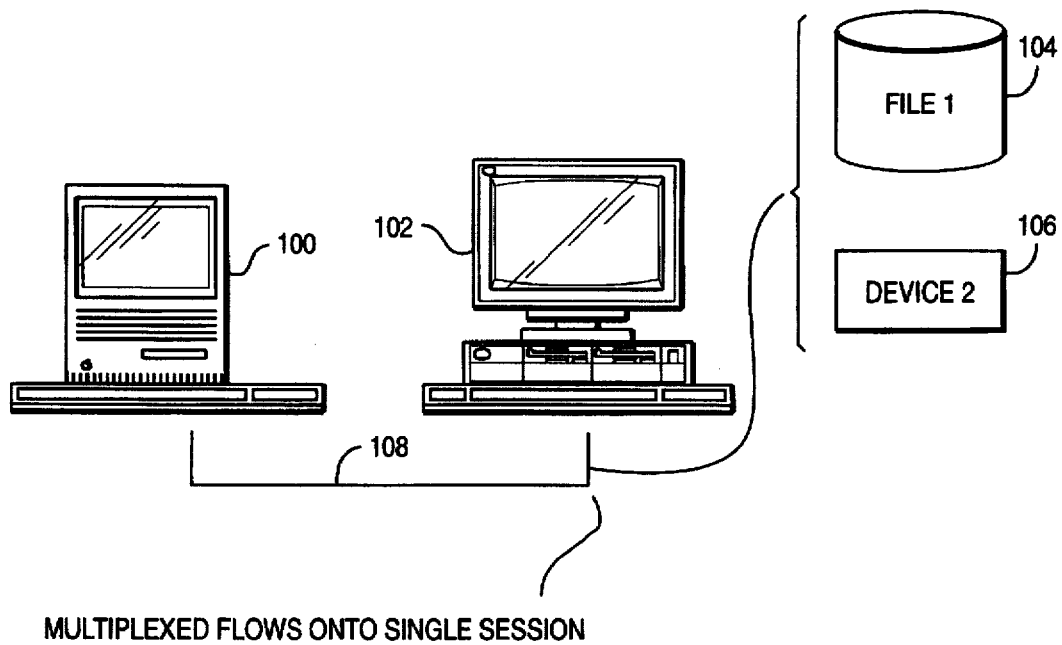
FIG. 5 is another simplified illustration of a workstation network interconnection in another embodiment of the invention providing for multiplexed multimedia flows on a single session having differing priorities.

Turning now to FIG. 5, this figure is intended to more practically represent the multiplexed flows of data at varying qualities of service at a single session, as briefly hereinbefore with reference to the rightmost portion of FIG. 3. In this implementation, again data having differing quality of service requirements (or none) may be seen graphically illustrated as file 1, 104, and device 2, 106. In this preferred embodiment, however, a session may have been established between computers 100 and 102 shown by line 108. It is contemplated that data elements corresponding to differing QOS needs may nevertheless be transmitted or multiplexed on the same single session 108. In this manner, the aforementioned real-time video captured by device 2, 106, may be given a high priority and transmitted on the session 108 in preference to but nevertheless multiplexed with lower priority data associated with file 1, 104.

Turning now to FIGS. 6 and 7, it is an important feature of the invention that data elements belonging to sessions or connections having a preselected quality of service from one or more service channels at one layer of a layered reference model may be transferred to one or more service channels of another layer.

Thus, turning now to FIGS. 6 and 7, they are intended to represent a more generalized case than that of FIG. 3, and represent the notion that multiple channels or priority queues may be provided at a plurality of layers providing quality of service guarantees.

FIG. 6 is an OSI depiction of a layer N service access point (SAP) 116 which is an addressable unit by which layer N, 112, provides service access in a layer N+1 sap, 114, to a layer N+1, 110, user. The invention extends or replaces this abstraction by which a layer N service offers a multiplicity of service priorities that correspond to the deadline, period or quality of service to be provided to a layer N+1 user.

FIG. 7 shows in more detail the layered, 118, 120, service channel model portion of the open system of FIG. 3, showing the plurality of layered service channels such as 122–124 for layer 118, and channels 126–128 for layer 120.

Figure 8:
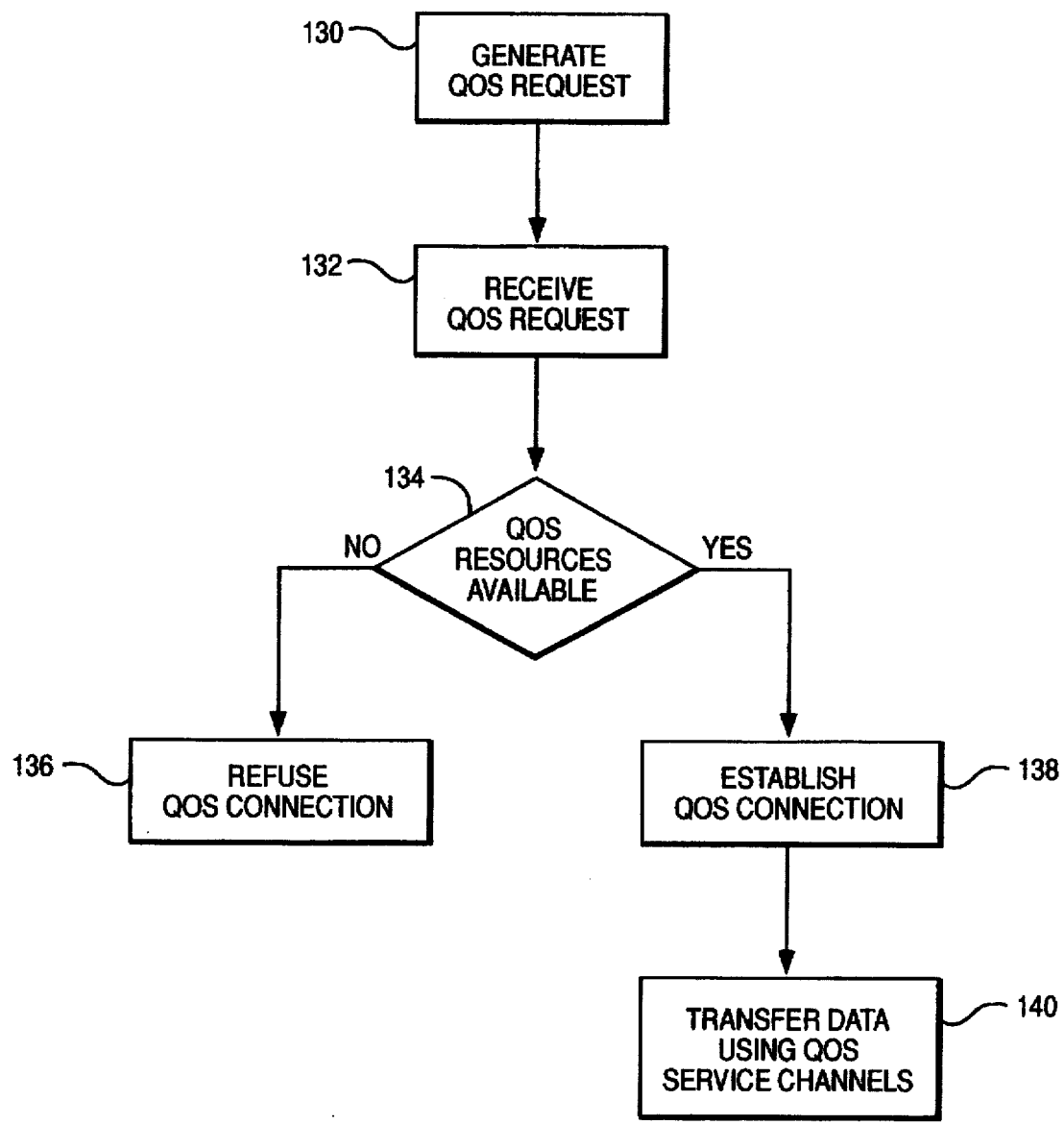
FIG. 8 is a flowchart detailing the program logic in accordance with one embodiment of the invention.

Turning now to FIG. 8, a flow diagram is provided which may be implemented in software for use by the network system in effecting one embodiment of the invention. First, a request for a quality of service transfer 130, is placed on the network 210 or 240 by one of the workstations 220 which may be a client or an application program. The QOS request is received, 132, by the host or server 220 or communications transport product, which then determines whether sufficient QOS resources are available in the network to service the request 134. If not, as indicated as block 136, the QOS session or connection is refused. If, on the other hand, sufficient resource is available, the QOS connection is established, 138, and transfer of data commences utilizing the aforementioned plurality of QOS service channels extending through the multiple layers of the reference model 140, in accordance with the invention.

Figure 9A:
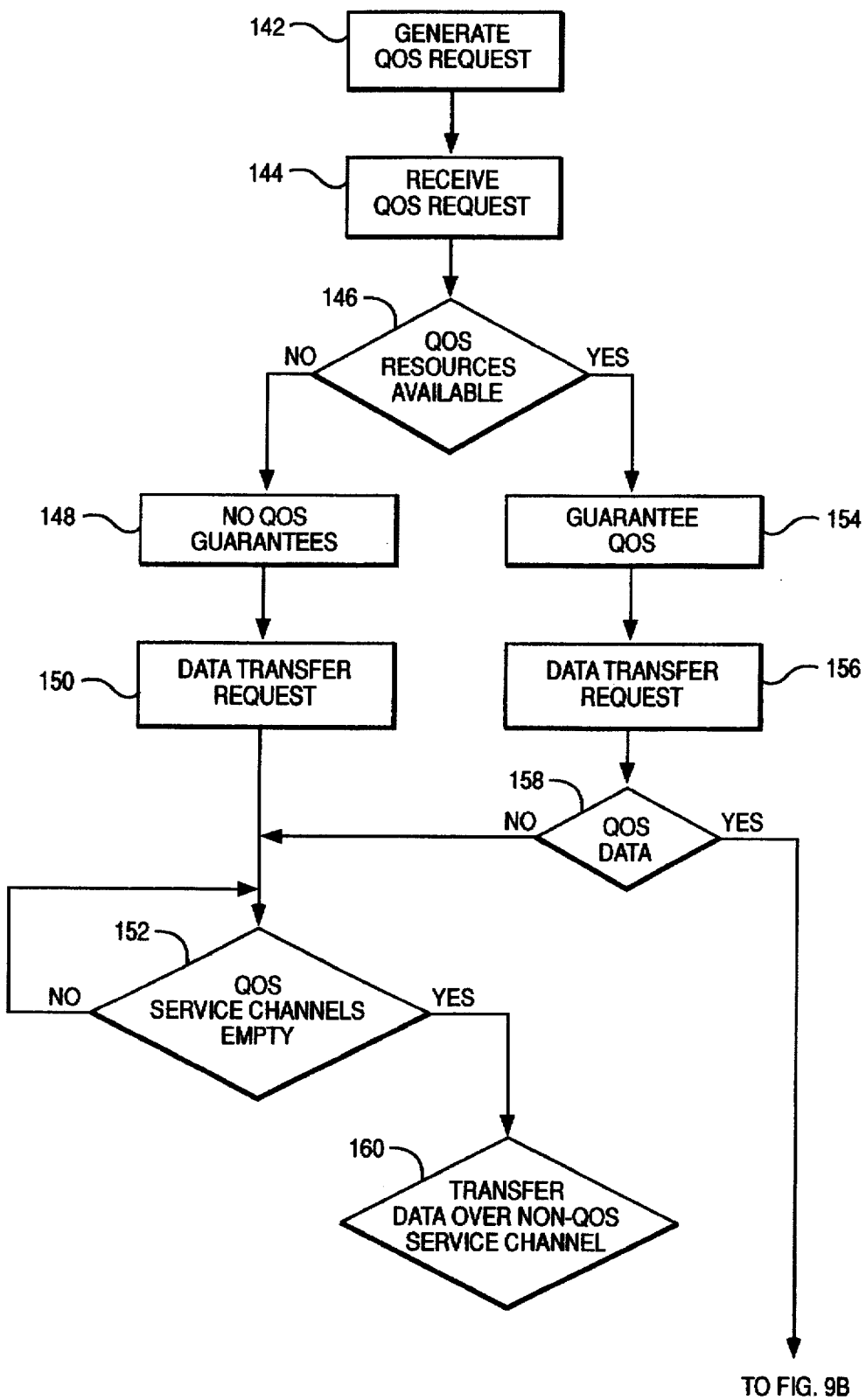
FIGS. 9A and 9B is a flowchart detailing the program logic of another embodiment of the subject invention.
Figure 9B:
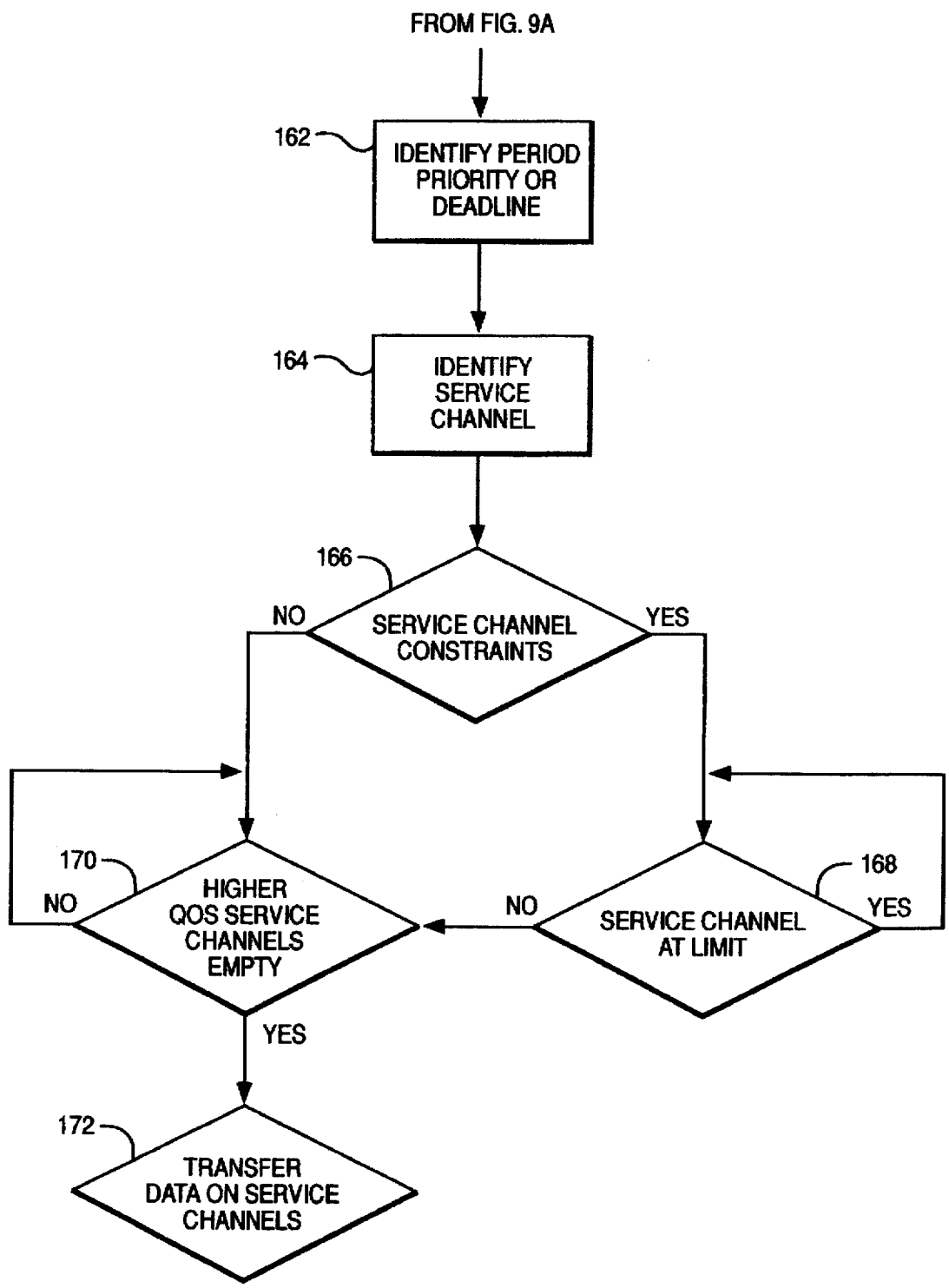

Turning now to FIGS. 9A and 9B, a more detailed flow diagram for an alternate embodiment of the invention is provided wherein elements from a service channel having a higher priority, deadline or period are transferred from a layer N+1 service channel to layer N service channel before elements from a service channel having a lower priority, deadline, or period are transferred. First, as in the case of the prior embodiment, one of the network computers may generate a QOS request 142, which is then received by the host or server 144. Again, the server or host determines whether QOS resources are available, 146, to service the request. If this is not the case, QOS guarantees are not provided. Upon a subsequent data transfer request 150, the server or host determines whether QOS service channels are empty, 152, and if not, a polling procedure is entered looping back on the block 152 for the channel to empty so that lower priority data may be transferred. Upon the QOS service channel's emptying, data is then transferred over non-QOS service channels 160.

If a QOS request has been received, 144, and QOS resources are available, 146, one or more priority channels will be reserved such that a QOS guarantee may be made, 154. Upon a subsequent data transfer request 156, the server or host will determine whether QOS data is involved, 158. If not, the hereinbefore described process relative to blocks 152 and 160 will be repeated. If, on the other hand, QOS data is involved in the data transfer request 158, the host or server will thereafter identify the period, priority, or deadline associated with the desires QOS transfer and thereafter will identify an appropriate service channel 164. The host or server thereafter will determine whether service channel constraints exist, 166. If so, the system next determines whether the service channel is at the predetermined limit 168, in which case again a polling loop is entered, looping back on the block 168 determination. When the service channel is detected as not being at a limit, the system then detects whether higher priority QOS service channels are empty, 170. If not, again a polling routine is entered looping back on the block 170 determination until higher priority traffic is handled whereupon flow exits to the right of block 170 and data is transferred in the desired manner on the service channels 172.

Referring back to block 166, if there were no service channel constraints 166, the logic flow exits from the right of block 166 to the subsequent determination of whether a higher QOS service channel or channels are empty, 170, and the process thence continues in the manner previously described.

From the foregoing relative to FIGS. 9A and 9B, it is apparent that no attempt is made to put lower priority traffic in a higher priority channel. Rather, when two channels from layer N+1 to a single channel at layer N exist, in a preferred embodiment the number of lower priority requests will be constrained which go into the layer N channel from the layer N+1 lower priority service channel. In this manner, the system may determine how long a higher priority service channel request will have to wait, at maximum, to obtain access to the layer N service channel. The system moreover avoids putting lower priority requests into the service channel when there are higher priority requests waiting to go to the same channel.

While the invention has been shown and described with reference to particular embodiments thereof, it will be understood by those skilled in the art that the foregoing and other changes in form and detail may be made therein without departing from the spirit and scope of the invention.

We claim:

1. A method for use in a multilayered computer communication network having a pre-existing session established to ensure transmission of data elements between computers at least at one predetermined quality of service; comprising generating a request from one of said computers for said transmission of data elements at said at least one quality of service;

multiplexing said transmission at said at least one quality of service on said pre-existing session; and transferring said data elements of said at least one quality of service transmission through at least one service channel of a first layer of said network to at least one service channel of a second layer of said network.

2. The method of claim 1 wherein said pre-existing session includes a non-quality of service transmission multiplexed with said at least one quality of service transmission in said session.

3. The method of claim 1 wherein said multiplexing of said transmission at said at least one quality of service comprises a multiplexing of a plurality of transmissions, each with a different quality of service.

4. The method of claim 1 wherein said pre-existing session includes a preselected quality of service transmission, and wherein said method includes the further step of altering said quality of service of said at least one quality of service transmission for a next said transmission.

5. The method of claim 4 wherein said altering is with a session modify command.

6. The method of claim 1 wherein, for each said at least one quality of service transmission, the method comprises the additional steps of identifying a quality of service associated with each said transmission of a particular group of data elements; and transferring each said particular group of data elements at a quality of service determined by said identifying.

7. The method of claim 6 wherein said identifying of said quality of service comprises identifying a priority, deadline, or period associated with said particular group of data elements.

8. The method of claim 6 wherein said identifying step comprises determining the ratio of a burst and a throughput quality of service parameter.

9. The method of claim 1 wherein said transferring said data elements includes transferring said data elements through a plurality of service channels each having a different priority associated therewith and receiving a plurality of subgroups of said data elements having a corresponding different qualities of service and priorities associated therewith through corresponding ones of said channels.

10. A method for use in a multilayered computer communication network having at least an N+1 layer and an N layer to ensure transmission of data elements between computers at least at one predetermined quality of service, comprising establishing two or more service channels in said N+1 layer;

establishing one or more service channels in said N layer; and transferring said data elements from said two or more channels in said N+1 layer to said one or more channels in said N layer at said predetermined quality of service.

11. The method of claim 10 wherein selected groups of said data elements from said two or more channels have a higher and a lower priority, deadline, or period respectively; and wherein said selected groups having said higher priority are transferred from said N+1 layer through said two or more channels to said one or more channels of said N layer before said selected groups having said lower priority are transferred.

12. The method of claim 11 including preselecting a fixed number of data elements to be received in said one or more channels at said lower priority in said transfer from said N+1 layer to said N layer;

servicing up to said fixed number of data elements in said one or more service channels in said N layer at said lower priority; and discontinuing said transfer of said data elements at said lower priority when said fixed number of data elements per unit of time is reached.

13. An apparatus for use in a multilayered computer communication network having a pre-existing session established to ensure transmission of data elements between computers at least at one predetermined quality of service; comprising means for generating a request from one of said computers for said transmission of data elements at said at least one quality of service;

means for multiplexing said transmission at said at least one quality of service on said pre-existing session; and means for transferring said data elements of said at least one quality of service transmission through at least one service channel of a first layer of said network to at least one service channel of a second layer of said network.

14. The apparatus of claim 13 wherein said apparatus includes means for providing a non-quality of service transmission multiplexed with said at least one quality of service transmission in said session.

15. The apparatus of claim 13 wherein said multiplexing of said transmission at said at least one quality of service comprises a multiplexing of a plurality of transmissions, each with a different quality of service.

16. The apparatus of claim 13 wherein said apparatus includes means for providing a preselected quality of service transmission, and wherein said apparatus includes means for altering said quality of service of said at least one quality of service transmission for a next said transmission.

17. The apparatus of claim 16 wherein said altering is with a session modify command.

18. The apparatus of claim 13 wherein, for each said at least one quality of service transmission, the apparatus further comprises means for identifying a quality of service associated with each said transmission of a particular group of data elements; and means for transferring each said particular group of data elements at a quality of service determined by said identifying.

19. The apparatus of claim 13 wherein said means for identifying said quality of service comprises means for identifying a priority, deadline, or period associated with said particular group of data elements.

20. The apparatus of claim 18 wherein said means for identifying comprises means for determining the ratio of a burst and a throughput quality of service parameter.

21. The apparatus of claim 13 wherein said means for transferring said data elements includes means for transferring said data elements through a plurality of service channels each having a different priority associated therewith and receiving a plurality of subgroups of said data elements having a corresponding different qualities of service and priorities associated therewith through corresponding ones of said channels.

22. Apparatus for use in a multilayered computer communication network having at least an N+1 layer and an N layer to ensure transmission of data elements between computers at least at one predetermined quality of service, comprising means for establishing two or more service channels in said N+1 layer;

means for establishing one or more service channels in said N layer; and means for transferring said data elements from said two or more channels in said N+1 layer to said one or more channels in said N layer at said predetermined quality of service.

23. The apparatus of claim 22 wherein selected groups of said data elements from said two or more channels have a higher and a lower priority, deadline, or period respectively; and wherein said selected groups having said higher priority are transferred from said N+1 layer through said two or more channels to said one or more channels of said N layer before said selected groups having said lower priority are transferred.

24. The apparatus of claim 23 including means for preselecting a fixed number of data elements to be received in said one or more channels at said lower priority in said transfer from said N+1 layer to said N layer;

means for servicing up to said fixed number of data elements in said one or more service channels in said N layer at said lower priority; and means for discontinuing said transfer of said data elements at said lower priority when said fixed number of data elements per unit of time is reached.

25. A computer program product for use in a multilayered computer communication network having at least an N+1 layer and an N layer comprising a computer usable medium having computer readable program code means embodied in said medium to ensure transmission of data elements between computers at least at one predetermined quality of service, said computer program product having:

program code means for establishing two or more service channels in said N+1 layer;

program code means for establishing one or more service channels in said N layer; and program code means for transferring said data elements from said two or more channels in said N+1 layer to said one or more channels in said N layer at said predetermined quality of service.

26. The program product of claim 25 wherein selected groups of said data elements from said two or more channels have a higher and a lower priority, deadline, or period respectively; and wherein said selected groups having said higher priority are transferred from said N+1 layer through said two or more channels to said one or more channels of said N layer before said selected groups having said lower priority are transferred.

27. The program product of claim 26 including program code means for preselecting a fixed number of data elements to be received in said one or more channels at said lower priority in said transfer from said N+1 layer to said N layer;

program code means for servicing up to said fixed number of data elements in said one or more service channels in said N layer at said lower priority; and program code means for discontinuing said transfer of said data elements at said lower priority when said fixed number of data elements per unit of time is reached.

* * * * *